(12) United States Patent
El Dokor

(10) Patent No.: US 8,625,855 B2
(45) Date of Patent: *Jan. 7, 2014

(54) THREE DIMENSIONAL GESTURE RECOGNITION IN VEHICLES

(71) Applicant: Edge3 Technologies LLC, Phoenix, AZ (US)

(72) Inventor: Tarek El Dokor, Phoenix, AZ (US)

(73) Assignee: Edge 3 Technologies LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/762,332

(22) Filed: Feb. 7, 2013

(65) Prior Publication Data

US 2013/0156296 A1 Jun. 20, 2013

Related U.S. Application Data

(63) Continuation of application No. 12/784,022, filed on May 20, 2010, now Pat. No. 8,396,252.

(51) Int. Cl.
*G06K 9/00* (2006.01)
*G06K 9/46* (2006.01)
*G06K 9/62* (2006.01)

(52) U.S. Cl.
USPC .......... 382/106; 382/154; 382/181; 382/190; 382/224; 382/225

(58) Field of Classification Search
USPC .................. 382/106, 154, 181, 190, 224, 225
See application file for complete search history.

(56) References Cited

U.S. PATENT DOCUMENTS

| | | |
|---|---|---|
| 5,454,043 A | 9/1995 | Freeman |
| 5,544,050 A | 8/1996 | Abe et al. |
| 5,581,276 A | 12/1996 | Cipolla et al. |
| 5,594,469 A | 1/1997 | Freeman et al. |
| 5,699,441 A | 12/1997 | Sagawa et al. |
| 5,767,842 A | 6/1998 | Korth |
| 5,887,069 A | 3/1999 | Sakou et al. |
| 5,990,865 A | 11/1999 | Gard |
| 6,002,808 A | 12/1999 | Freeman |
| 6,072,494 A | 6/2000 | Nguyen |
| 6,075,895 A | 6/2000 | Qiao et al. |
| 6,115,482 A | 9/2000 | Sears et al. |
| 6,128,003 A | 10/2000 | Smith et al. |
| 6,141,434 A | 10/2000 | Christian et al. |

(Continued)

OTHER PUBLICATIONS

Freeman, W. T. et al., "The Design and Use of Steerable Filters", *IEEE Transactions of Pattern Analysis and Machine Intelligence* V. 13, (Sep. 1991),891-906.

(Continued)

*Primary Examiner* — Utpal Shah
(74) *Attorney, Agent, or Firm* — Gordon Kessler

(57) ABSTRACT

A method and system for performing gesture recognition of a vehicle occupant employing a time of flight (TOF) sensor and a computing system in a vehicle. An embodiment of the method of the invention includes the steps of receiving one or more raw frames from the TOF sensor, performing clustering to locate one or more body part clusters of the vehicle occupant, calculating the location of the tip of the hand of the vehicle occupant, determining whether the hand has performed a dynamic or a static gesture, retrieving a command corresponding to one of the determined static or dynamic gestures, and executing the command.

18 Claims, 6 Drawing Sheets

(56) References Cited

U.S. PATENT DOCUMENTS

| | | | |
|---|---|---|---|
| 6,147,678 A | 11/2000 | Kumar et al. | |
| 6,181,343 B1 | 1/2001 | Lyons | |
| 6,195,104 B1 | 2/2001 | Lyons | |
| 6,204,852 B1 | 3/2001 | Kumar et al. | |
| 6,215,890 B1 | 4/2001 | Matsuo et al. | |
| 6,222,465 B1 | 4/2001 | Kumar et al. | |
| 6,240,197 B1 | 5/2001 | Christian et al. | |
| 6,240,198 B1 | 5/2001 | Rehg et al. | |
| 6,252,598 B1 | 6/2001 | Segen | |
| 6,256,033 B1 | 7/2001 | Nguyen | |
| 6,256,400 B1 | 7/2001 | Takata et al. | |
| 6,269,172 B1 | 7/2001 | Rehg et al. | |
| 6,323,942 B1 | 11/2001 | Bamji | |
| 6,324,453 B1 | 11/2001 | Breed et al. | |
| 6,360,003 B1 | 3/2002 | Doi et al. | |
| 6,363,160 B1 | 3/2002 | Bradski et al. | |
| 6,377,238 B1 | 4/2002 | McPheters | |
| 6,389,182 B1 | 5/2002 | Ihara et al. | |
| 6,394,557 B2 | 5/2002 | Bradski | |
| 6,400,830 B1 | 6/2002 | Christian et al. | |
| 6,434,255 B1* | 8/2002 | Harakawa | 382/103 |
| 6,442,465 B2 | 8/2002 | Breed et al. | |
| 6,456,728 B1 | 9/2002 | Doi et al. | |
| 6,478,432 B1 | 11/2002 | Dyner | |
| 6,509,707 B2 | 1/2003 | Yamashita et al. | |
| 6,512,838 B1 | 1/2003 | Rafii et al. | |
| 6,526,156 B1 | 2/2003 | Black et al. | |
| 6,553,296 B2 | 4/2003 | Breed et al. | |
| 6,556,708 B1 | 4/2003 | Christian et al. | |
| 6,571,193 B1 | 5/2003 | Unuma et al. | |
| 6,590,605 B1 | 7/2003 | Eichenlaub | |
| 6,600,475 B2 | 7/2003 | Gutta et al. | |
| 6,608,910 B1 | 8/2003 | Srinivasa et al. | |
| 6,614,422 B1 | 9/2003 | Rafii et al. | |
| 6,624,833 B1* | 9/2003 | Kumar et al. | 715/863 |
| 6,674,877 B1 | 1/2004 | Jojic et al. | |
| 6,674,895 B2 | 1/2004 | Rafii et al. | |
| 6,678,425 B1 | 1/2004 | Flores et al. | |
| 6,681,031 B2 | 1/2004 | Cohen et al. | |
| 6,683,968 B1 | 1/2004 | Pavlovic et al. | |
| 6,757,571 B1 | 6/2004 | Toyama | |
| 6,766,036 B1 | 7/2004 | Pryor | |
| 6,768,486 B1 | 7/2004 | Szabo et al. | |
| 6,788,809 B1 | 9/2004 | Grzeszczuk et al. | |
| 6,795,567 B1 | 9/2004 | Cham et al. | |
| 6,801,637 B2 | 10/2004 | Voronka et al. | |
| 6,804,396 B2 | 10/2004 | Higaki et al. | |
| 6,829,730 B2 | 12/2004 | Nadeau-Dostie et al. | |
| 6,857,746 B2 | 2/2005 | Dyner | |
| 6,901,561 B1 | 5/2005 | Kirkpatrick et al. | |
| 6,937,742 B2 | 8/2005 | Roberts et al. | |
| 6,940,646 B2 | 9/2005 | Taniguchi et al. | |
| 6,944,315 B1 | 9/2005 | Zipperer et al. | |
| 6,950,534 B2 | 9/2005 | Cohen et al. | |
| 6,993,462 B1 | 1/2006 | Pavlovic et al. | |
| 7,039,676 B1 | 5/2006 | Day et al. | |
| 7,046,232 B2 | 5/2006 | Inagaki et al. | |
| 7,050,606 B2 | 5/2006 | Paul et al. | |
| 7,050,624 B2 | 5/2006 | Dialameh et al. | |
| 7,058,204 B2 | 6/2006 | Hildreth et al. | |
| 7,065,230 B2 | 6/2006 | Yuasa et al. | |
| 7,068,842 B2 | 6/2006 | Liang et al. | |
| 7,095,401 B2 | 8/2006 | Liu et al. | |
| 7,102,615 B2 | 9/2006 | Marks | |
| 7,129,927 B2 | 10/2006 | Mattsson | |
| 7,170,492 B2 | 1/2007 | Bell | |
| 7,190,811 B2 | 3/2007 | Ivanov | |
| 7,203,340 B2 | 4/2007 | Gorodnichy | |
| 7,212,663 B2 | 5/2007 | Tomasi | |
| 7,221,779 B2 | 5/2007 | Kawakami et al. | |
| 7,224,830 B2 | 5/2007 | Nefian et al. | |
| 7,224,851 B2 | 5/2007 | Kinjo | |
| 7,233,320 B1 | 6/2007 | Lapstun et al. | |
| 7,236,611 B2 | 6/2007 | Roberts et al. | |
| 7,239,718 B2 | 7/2007 | Park et al. | |
| 7,257,237 B1 | 8/2007 | Luck et al. | |
| 7,274,800 B2 | 9/2007 | Nefian et al. | |
| 7,274,803 B1 | 9/2007 | Sharma et al. | |
| 7,289,645 B2 | 10/2007 | Yamamoto et al. | |
| 7,295,709 B2 | 11/2007 | Cootes et al. | |
| 7,296,007 B1 | 11/2007 | Funge et al. | |
| 7,308,112 B2* | 12/2007 | Fujimura et al. | 382/103 |
| 7,340,077 B2 | 3/2008 | Gokturk et al. | |
| 7,340,078 B2 | 3/2008 | Shikano et al. | |
| 7,342,485 B2 | 3/2008 | Joehl et al. | |
| 7,346,192 B2 | 3/2008 | Yuasa et al. | |
| 7,348,963 B2 | 3/2008 | Bell | |
| 7,359,529 B2 | 4/2008 | Lee | |
| 7,372,977 B2 | 5/2008 | Fujimura et al. | |
| 7,379,563 B2 | 5/2008 | Shamaie | |
| 7,391,409 B2 | 6/2008 | Zalewski et al. | |
| 7,394,346 B2 | 7/2008 | Bodin | |
| 7,412,077 B2 | 8/2008 | Li et al. | |
| 7,415,126 B2 | 8/2008 | Breed et al. | |
| 7,415,212 B2 | 8/2008 | Matsushita et al. | |
| 7,421,093 B2 | 9/2008 | Hildreth et al. | |
| 7,423,540 B2 | 9/2008 | Kisacanin | |
| 7,444,001 B2 | 10/2008 | Roberts et al. | |
| 7,450,736 B2 | 11/2008 | Yang et al. | |
| 7,460,690 B2 | 12/2008 | Cohen et al. | |
| 7,477,758 B2 | 1/2009 | Piirainen et al. | |
| 7,489,308 B2 | 2/2009 | Blake et al. | |
| 7,489,806 B2 | 2/2009 | Mohri et al. | |
| 7,499,569 B2 | 3/2009 | Sato et al. | |
| 7,512,262 B2 | 3/2009 | Criminisi et al. | |
| 7,519,223 B2 | 4/2009 | Dehlin et al. | |
| 7,519,537 B2 | 4/2009 | Rosenberg | |
| 7,574,020 B2 | 8/2009 | Shamaie | |
| 7,590,262 B2 | 9/2009 | Fujimura et al. | |
| 7,593,552 B2* | 9/2009 | Higaki et al. | 382/118 |
| 7,598,942 B2 | 10/2009 | Underkoffler et al. | |
| 7,599,547 B2 | 10/2009 | Sun et al. | |
| 7,606,411 B2 | 10/2009 | Venetsky et al. | |
| 7,614,019 B2 | 11/2009 | Rimas Ribikauskas et al. | |
| 7,620,316 B2 | 11/2009 | Boillot | |
| 7,646,372 B2 | 1/2010 | Marks et al. | |
| 7,660,437 B2 | 2/2010 | Breed | |
| 7,665,041 B2 | 2/2010 | Wilson et al. | |
| 7,676,062 B2 | 3/2010 | Breed et al. | |
| 7,720,282 B2 | 5/2010 | Blake et al. | |
| 7,721,207 B2 | 5/2010 | Nilsson | |
| 7,804,998 B2 | 9/2010 | Mundermann et al. | |
| 2001/0030642 A1 | 10/2001 | Sullivan et al. | |
| 2002/0041327 A1* | 4/2002 | Hildreth et al. | 348/42 |
| 2002/0064382 A1 | 5/2002 | Hildreth et al. | |
| 2002/0090133 A1 | 7/2002 | Kim et al. | |
| 2002/0140633 A1 | 10/2002 | Rafii et al. | |
| 2004/0001182 A1 | 1/2004 | Dyner | |
| 2004/0183775 A1 | 9/2004 | Bell | |
| 2005/0002074 A1 | 1/2005 | McPheters et al. | |
| 2005/0083314 A1 | 4/2005 | Shalit et al. | |
| 2005/0105775 A1 | 5/2005 | Luo et al. | |
| 2005/0190443 A1 | 9/2005 | Nam et al. | |
| 2005/0286756 A1 | 12/2005 | Hong et al. | |
| 2006/0093186 A1 | 5/2006 | Ivanov | |
| 2006/0101354 A1 | 5/2006 | Hashimoto et al. | |
| 2006/0136846 A1 | 6/2006 | Im et al. | |
| 2006/0139314 A1 | 6/2006 | Bell | |
| 2006/0221072 A1 | 10/2006 | Se et al. | |
| 2007/0055427 A1 | 3/2007 | Sun et al. | |
| 2007/0113207 A1 | 5/2007 | Gritton | |
| 2007/0132721 A1 | 6/2007 | Glomski et al. | |
| 2007/0195997 A1 | 8/2007 | Paul et al. | |
| 2007/0263932 A1 | 11/2007 | Bernardin et al. | |
| 2007/0280505 A1 | 12/2007 | Breed | |
| 2008/0002878 A1 | 1/2008 | Meiyappan et al. | |
| 2008/0005703 A1 | 1/2008 | Radivojevic et al. | |
| 2008/0013793 A1 | 1/2008 | Hillis et al. | |
| 2008/0037875 A1 | 2/2008 | Kim et al. | |
| 2008/0052643 A1 | 2/2008 | Ike et al. | |
| 2008/0059578 A1 | 3/2008 | Albertson et al. | |
| 2008/0065291 A1 | 3/2008 | Breed | |
| 2008/0069415 A1 | 3/2008 | Schildkraut et al. | |
| 2008/0069437 A1 | 3/2008 | Baker | |

(56) References Cited

U.S. PATENT DOCUMENTS

| | | |
|---|---|---|
| 2008/0104547 A1 | 5/2008 | Morita et al. |
| 2008/0107303 A1 | 5/2008 | Kim et al. |
| 2008/0120577 A1 | 5/2008 | Ma et al. |
| 2008/0178126 A1 | 7/2008 | Beeck et al. |
| 2008/0181459 A1 | 7/2008 | Martin et al. |
| 2008/0219501 A1 | 9/2008 | Matsumoto |
| 2008/0219502 A1 | 9/2008 | Shamaie |
| 2008/0225041 A1 | 9/2008 | El Dokor et al. |
| 2008/0229255 A1 | 9/2008 | Linjama et al. |
| 2008/0240502 A1 | 10/2008 | Freedman et al. |
| 2008/0244465 A1 | 10/2008 | Kongqiao et al. |
| 2008/0244468 A1 | 10/2008 | Nishihara et al. |
| 2008/0267449 A1 | 10/2008 | Dumas et al. |
| 2008/0282202 A1 | 11/2008 | Sunday |
| 2009/0006292 A1 | 1/2009 | Block |
| 2009/0027337 A1 | 1/2009 | Hildreth |
| 2009/0037849 A1 | 2/2009 | Immonen et al. |
| 2009/0040215 A1 | 2/2009 | Afzulpurkar et al. |
| 2009/0060268 A1 | 3/2009 | Roberts et al. |
| 2009/0074248 A1 | 3/2009 | Cohen et al. |
| 2009/0077504 A1 | 3/2009 | Bell et al. |
| 2009/0079813 A1 | 3/2009 | Hildreth |
| 2009/0080526 A1 | 3/2009 | Vasireddy et al. |
| 2009/0085864 A1 | 4/2009 | Kutliroff et al. |
| 2009/0102788 A1 | 4/2009 | Nishida et al. |
| 2009/0102800 A1 | 4/2009 | Keenan |
| 2009/0103780 A1 | 4/2009 | Nishihara et al. |
| 2009/0108649 A1 | 4/2009 | Kneller et al. |
| 2009/0109036 A1 | 4/2009 | Schalla et al. |
| 2009/0110292 A1 | 4/2009 | Fujimura et al. |
| 2009/0115721 A1 | 5/2009 | Aull et al. |
| 2009/0116742 A1 | 5/2009 | Nishihara |
| 2009/0116749 A1 | 5/2009 | Cristinacce et al. |
| 2009/0150160 A1 | 6/2009 | Mozer |
| 2009/0153366 A1 | 6/2009 | Im et al. |
| 2009/0153655 A1 | 6/2009 | Ike et al. |
| 2009/0180668 A1 | 7/2009 | Jones et al. |
| 2009/0183125 A1 | 7/2009 | Magal et al. |
| 2009/0183193 A1 | 7/2009 | Miller, Iv |
| 2009/0189858 A1 | 7/2009 | Lev et al. |
| 2009/0208057 A1 | 8/2009 | Wilson et al. |
| 2009/0222149 A1 | 9/2009 | Murray et al. |
| 2009/0228841 A1* | 9/2009 | Hildreth ............ 715/863 |
| 2009/0231278 A1 | 9/2009 | St. Hilaire et al. |
| 2009/0244309 A1 | 10/2009 | Maison et al. |
| 2009/0249258 A1 | 10/2009 | Tang |
| 2009/0262986 A1 | 10/2009 | Cartey et al. |
| 2009/0268945 A1 | 10/2009 | Wilson et al. |
| 2009/0273563 A1 | 11/2009 | Pryor |
| 2009/0273574 A1 | 11/2009 | Pryor |
| 2009/0273575 A1 | 11/2009 | Pryor |
| 2009/0278915 A1 | 11/2009 | Kramer et al. |
| 2009/0295738 A1 | 12/2009 | Chiang |
| 2009/0296991 A1 | 12/2009 | Anzola |
| 2009/0315740 A1 | 12/2009 | Hildreth et al. |
| 2009/0316952 A1 | 12/2009 | Ferren et al. |

OTHER PUBLICATIONS

Simoncelli, E.P. et al., "Shiftable Multi-scale Transforms", *IEEE Transactions on Information Theory* V. 38, (Mar. 1992),587-607.
Simoncelli, E.P. et al., "The Steerable Pyramid: A Flexible Architecture for Multi-Scale Derivative Computation", *Proceedings of ICIP-95* V. 3, (Oct. 1995),444-447.
Chen, J et al., "Adaptive Perceptual Color-Texture Image Segmentation", *IEEE Transactions on Image Processing*, v. 14, No. 10, (Oct. 2005),1524-1536 (2004 revised draft).
Halfhill, Tom R., "Parallel Processing with CUDA", *Microprocessor Report*, Available at http://www.nvidia.com/docs/IO/55972/220401_Reprint.pdf, (Jan. 28, 2008).
Farber, Rob "CUDA, Supercomputing for the Masses: Part 4, The CUDA Memory Model", Under the High Performance Computing section of the Dr. Dobbs website, p. 3 available at http://www.ddj.com/hpc-high-performance-computing/208401741, 3, 2008.
Rajko, S et al., "HMM Parameter Reduction for Practice Gesture Recognition", *Proceedings of the International Conference on Automatic Gesture Recognition*, (Sep. 2008).
Hinton, Geoffrey et al., "A Fast Learning Algorithm for Deep Belief Nets", *Neural Computation*, V. 18, 1527-1554, 2006.
Susskind, Joshua M., et al., "Generating Facial Expressions with Deep Belief Nets", *Department of Psychology, Univ. of Toronto I-Tech Education and Publishing*, (2008),421-440.
Bleyer, Michael et al., "Surface Stereo with Soft Segmentation.", *Computer Vision and Pattern Recognition. IEEE*, 2010, (2010).
Chen, Junqing et al., "Adaptive perceptual color-texture image segmentation.", *The International Society for Optical Engineering, SPIE Newsroom*, (2006),1-2.
Forsyth, David A., et al., "Stereopsis", *In Compuer Vision a Modern Approach Prentice Hall*, 2003, (2003).
Harris, Mark et al., "Parallel Prefix Sum (Scan) with CUDA", vol. 39, in *GPU Gems 3*, edited by Hubert Nguyen, (2007).
Hirschmuller, Heiko "Stereo Vision in Structured Environments by Consistent Semi-Global Matching", *Computer Vision and Pattern Recognition, CVPR 06*, (2006),2386-2393.
Ivekovic, Spela et al., "Dense Wide-baseline Disparities from Conventional Stereo for Immersive Videoconferencing", *ICPR. 2004*, (2004),921-924.
Kaldewey, Tim et al., "Parallel Search on Video Cards.", *First USENIX Workshop on Hot Topics in Parallelism (HotPar '09)*, (2009).
Kirk, David et al., "Programming Massively Parallel Processors a Hands-on Approach", *Elsevier, 2010*, (2010).
Klaus, Andreas et al., "Segment-Based Stereo Matching Using Belief Propagation and a Self-Adapting Dissimilarity Measure", *Proceedings of ICPR 2006. IEEE. 2006*, (2006),15-18.
Kolmogorov, Vladimir et al., "Computing Visual Correspondence with Occlusions via Graph Cuts", *International Conference on Computer Vision. 2001.*, (2001).
Kolmogorov, Vladimir et al., "Generalized Multi-camera Scene Reconstruction Using Graph Cuts.", *Proceedings for the International Workshop on Energy Minimization Methods in Computer Vision and Pattern Recognition 2003.*, (2003).
Kuhn, Michael et al., "Efficient ASIC Implementation of a Real-Time Depth Mapping Stereo Vision System", Proceedings of 2009 IEEE International Conference on Acoustics, Speech and Signal Processing. Taipei, Taiwan: *IEEE, 2009.*, (2009).
Li, Shigang "Binocular Spherical Stereo", *IEEE Transactions on Intelligent Transportation Systems (IEEE)* 9, No. 4, (Dec. 2008),589-600.
Marsalek, M et al., "Semantic hierarchies for visual object recognition", Proceedings of IEEE Conference on Computer Vision and Pattern Recognition, 2007. CVPR '07. MN: *IEEE, 2007,* (2007),1-7.
Metzger, Wolfgang "Laws of Seeing", *MIT Press, 2006*, (2006).
Min, Dongbo et al., "Cost Aggregation and Occlusion Handling With WLS in Stereo Matching", Edited by IEEE. *IEEE Transactions on Image Processing 17* (2008), (2008),1431-1442.
"NVIDIA: CUDA compute unified device architecture, prog. guide, version 1.1", *NVIDIA*, (2007).
Remondino, Fabio et al., "Turning Images into 3-D Models", *IEEE Signal Processing Magazine*, (2008).
Richardson, Ian E., "H.264/MPEG-4 Part 10 White Paper", WhitePaper/www.vcodex.com, (2003).
Sengupta, Shubhabrata "Scan Primitives for GPU Computing", *Proceedings of the 2007 Graphics Hardware Conference*. San Diego, CA, 2007, (2007),97-106.
Sintron, Eric et al., "Fast Parallel GPU-Sorting Using a Hybrid Algorithm", *Journal of Parallel and Distributed Computing* (Elsevier) 68, No. 10, (Oct. 2008),1381-1388.
Wang, Zeng-Fu et al., "A Region Based Stereo Matching Algorithm Using Cooperative Optimization", *CVPR*, (2008).
Wei, Zheng et al., "Optimization of Linked List Prefix Computations on Multithreaded GPUs Using CUDA", *2010 IEEE International Symposium on Parallel & Distributed Processing* (IPDPS). Atlanta, (2010).
Wiegand, Thomas et al., "Overview of the H.264/AVC Video Coding Standard", *IEEE Transactions on Circuits and Systems for Video Technology 13*, No. 7, (Jul. 2003),560-576.

(56) References Cited

OTHER PUBLICATIONS

Woodford, O.J. et al., "Global Stereo Reconstruction under Second Order Smoothness Priors", *IEEE Transactions on Pattern Analysis and Machine Intelligence* (IEEE) 31, No. 12, (2009),2115-2128.

Yang, Qingxiong et al., "Stereo Matching with Color-Weighted Correlation, Hierarchical Belief Propagation, and Occlusion Handling", *IEEE Transactions on Pattern Analysis and Machine Intelligence* (IEEE) 31, No. 3, (Mar. 2009),492-504.

Zinner, Christian et al., "An Optimized Software-Based Implementation of a Census-Based Stereo Matching Algorithm", *Lecture Notes in Computer Science* (*SpringerLink*) *5358*, (2008),216-227.

"PCT Search report", PCT/US2010/035717, (Sep. 1, 2010),1-29.

"PCT Written opinion", PCT/US2010/035717, (Dec. 1, 2011),1-9.

"PCT Search report", PCT/US2011/49043, (Mar. 21, 2012), 1-4.

"PCT Written opinion", PCT/US2011/49043, (Mar. 21, 2012), 1-4.

"PCT Search report", PCT/US2011/049808, (Jan. 12, 2012), 1-2.

"PCT Written opinion", PCT/US2011/049808, (Jan. 12, 2012), 1-5.

"Non-Final Office Action", U.S. Appl. No. 12/784,123, (Oct. 2, 2012), 1-20.

"Non-Final Office Action", U.S. Appl. No. 12/784,022, (Jul. 16, 2012), 1-14.

Tieleman, T et al., "Using Fast weights to improve persistent contrastive divergence", *26th International Conference on Machine Learning* New York, NY ACM, (2009),1033-1040.

Sutskever, I et al., "The recurrent temporal restricted boltzmann machine", *NIPS, MIT Press*, (2008),1601-1608.

Parzen, E "On the estimation of a probability density function and the mode", *Annals of Math. Stats.*, 33, (1962),1065-1076.

Hopfield, J.J. "Neural networks and physical systems with emergent collective computational abilities", *National Academy of Sciences*, 79, (1982),2554-2558.

Culibrk, D et al., "Neural network approach to background modeling for video object segmentation", *IEEE Transactions on Neural Networks*, 18, (2007),1614-1627.

Benggio, Y et al., "Curriculum learning", *ICML 09 Proceedings of the 26th Annual International Conference on Machine Learning*, New York, NY: ACM, (2009).

Benggio, Y et al., "Scaling learning algorithms towards AI. In L. a Bottou", *Large Scale Kernel Machines*, MIT Press,(2007).

Battiato, S et al., "Exposure correction for imaging devices: An overview", in R. Lukac (Ed.), *Single Sensor Imaging Methods and Applications for Digital Cameras* CRC Press,(2009),323-350.

W.T. Freeman, et al., "The Design and Use of Steerable Filters," IEEE Transactions of Pattern Analysis and Machine Intelligence, v. 13, p. 891-906 (Sep. 1991).

E.P. Simoncelli, et al., "Shiftable Multi-scale Transforms," IEEE Transactions on Information Theory, v. 38, p. 587-607 (Mar. 1992).

E.P. Simoncellie, et al., "The Steerable pyramid: A Flexible Architecture for Multi-Scale Derivative Cooomputation," Proceedings of ICIP-95, v. 3, p. 444-447 (Oct. 1995).

J. Chen, et al., "Adaptive Perceptual Color-Texture Image Segmentation," IEEE Transactions on Image Processing, v. 14, No. 10, p. 1524-1536 (Oct. 2005).

"Parallel Processing with CUDA," by Tom R. Halfhill, Microprocessor Report (Jan. 28, 2008) available at http://www.nvidia.com/docs/IO/55972/220401_Reprint.pdf.

"CUDA, Supercomputing for the Masses: Part 4, The CUDA Memory Model," by Rob Farber under the High Performance Computing section of the Dr. Dobbs website, p. 3 available at http://www.ddj.com/hpc-high-performance-computing/208401741, 2008.

S. Rajko, et al., "HMM Parameter Reduction for Practice Gesture Recognition," Proceedings of the International Conference on Automatic Gesture Recognition (Sep. 2008).

Geoffrey Hinton, et al., entitled "A Fast Learning Algorithm for Deep Belief Nets," Neural Computation, v. 18 p. 1527-1554, 2006.

\* cited by examiner

```
┌─────────────────────────────────────┐
│ Retrieve a Command Corresponding to │
│      the Determined Gesture         │
│                610                  │
└─────────────────────────────────────┘
                  │
                  ▼
┌─────────────────────────────────────┐
│    Execute the Command Using the    │
│ Computing System and/or the 2D Display │
│                620                  │
└─────────────────────────────────────┘
```

FIGURE 6

```
┌─────────────────────────────────────┐
│  Review a Previously Executed Gesture │
│     Recognition Process or Step     │
│                710                  │
└─────────────────────────────────────┘
                  │
                  ▼
┌─────────────────────────────────────┐
│   Determine New Values for Algorithm/ │
│   System Parameters in Accordance With │
│  Information Determined From the Review │
│                720                  │
└─────────────────────────────────────┘
                  │
                  ▼
┌─────────────────────────────────────┐
│  Store the New Parameters in the One or │
│ More Databases or the Computing System │
│                730                  │
└─────────────────────────────────────┘
```

FIGURE 7

THREE DIMENSIONAL GESTURE RECOGNITION IN VEHICLES

CROSS-REFERENCE TO RELATED APPLICATIONS

This application is a continuation of U.S. patent application Ser. No. 12/784,022 filed May 20, 2010 to El Dokor et al. titled Systems and Related Methods for Three-Dimensional Gesture Recognition in Vehicles, the entire contents thereof being incorporated herein by reference.

FIELD OF THE INVENTION

This invention relates generally to implementations of three dimensional (3D) gesture recognition systems and related methods, and more particularly, relate to communication and data access systems for use in vehicles.

BACKGROUND OF THE INVENTION

Particular implementations of 3D gesture recognition systems and related methods can enable data access and communication by a vehicle driver while maximizing the time the driver is watching the road. Because the use of gesture recognition permits the driver to interact with a computing system without requiring touching or use of an interface device (such as a keyboard or mouse), the driver's hands are essentially free at almost all times for performing driving tasks. Other implementations of 3D gesture recognition systems and related methods may be used in a wide variety of other systems and use conditions. Promoting eyes on the road is a key aspect of any vehicular human-machine interface.

Conventional approaches to 3D gesture recognition exist. Conventional approaches to 3D gesture recognition suffer from a number of difficulties such as robustness, perspective, lens aberrations, pose, weak responses to lighting conditions, sensor saturation, weak performance under very violent vibration conditions, differences in skin tone from user to user, variable lighting conditions, and many other challenges. Conventional solutions typically approach solving these problems by developing predictive algorithms that utilize definite and absolute thresholds for various critical parameters in their algorithms. The problem with such systems is that they cannot easily adapt if they encounter situations that are beyond a particular algorithm's threshold, or outside the scope of usability of a given set of algorithms and implementations. Other approaches utilize time-of-flight cameras to mitigate the need for scene reconstruction, or even creating a depth map. The problem with TOF sensors is that they have very unpredictable responses to both, very strong ambient lighting conditions, as well as very high vibration-motion blur is a major issue with TOF sensors. Motion blur can wreak havoc on the image acquisition process, undermining the entire gesture recognition system.

Therefore, it would be desirable to provide an apparatus that overcomes the drawbacks of the prior art.

SUMMARY OF THE INVENTION

In accordance with one or more embodiments of the present invention, implementations of 3D gesture recognition systems are described that combine machine learning methodologies with vision algorithms for TOF camera-based systems to create an adaptive capability that permits the system to modify its algorithms to "learn" each user of the system. Because the system moves from a set of default, pre-trained values for its algorithms to a set of learned values without using absolute thresholds, the system does not rely on external algorithm revisions to improve its accuracy. The system can improve its own algorithms as it interacts with the user. Implementations of 3D gesture recognition systems described in this document are sufficiently robust for use in accuracy-critical industries like the automotive industry and others where adaptive capability is critical if gesture recognition systems are to be widely adopted.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which:

FIG. 6 is a flowchart diagram depicting processing for executing a command in accordance with an embodiment of the present invention; and FIG. 7 is a is a flowchart diagram depicting processing for updating one or more system parameters in accordance with an embodiment of the present invention.

DETAILED DESCRIPTION OF THE PREFERRED EMBODIMENTS

Figure 1:
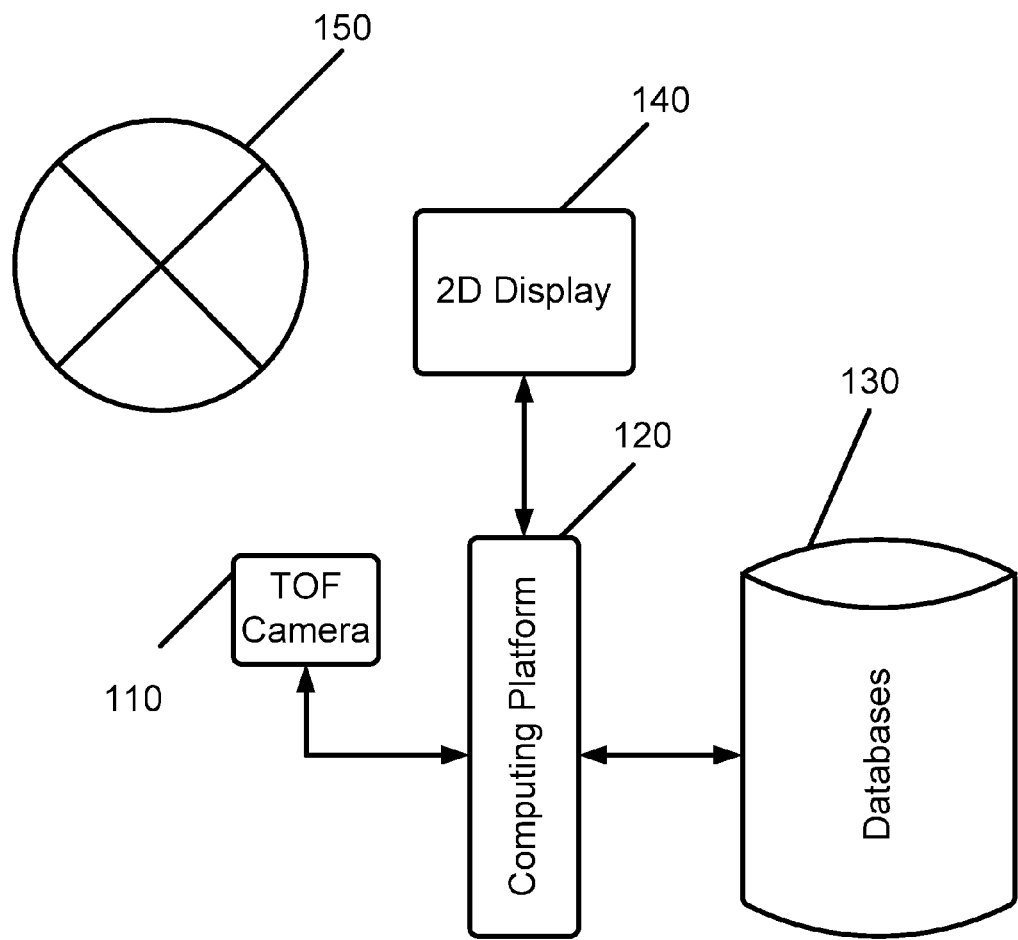
FIG. 1 is a block diagram depicting an embodiment of the present invention.

Various embodiments of the invention will now be described making reference to the figures in which like reference numbers denote like steps or structure. Referring first to FIG. 1, an implementation of a 3D gesture recognition system in accordance with an embodiment of the present invention is illustrated. As is shown in FIG. 1, a first embodiment of a 3D gesture recognition system may include a time of flight (TOF) camera 110 coupled with a computing platform 120. The computing platform may include or may be coupled with one or more databases 130. Output from the computing platform may be displayed on a two dimensional (2D) screen or display 140 that may or may not include touch interaction capability in particular implementations. The TOF camera is oriented relative to a vehicle control 150 present in the vehicle so that gestures made by one or both hands of a driver operating the vehicle, passenger in the vehicle, or other desired individual in the vehicle may be acquired as a series of images. In the implementation illustrated in FIG. 1, the vehicle control is preferably a steering wheel. In other implementations, the vehicle may comprise a train, airplane or the like, and thus the vehicle control will be presented as appropriate for the particular vehicle in use.

Examples of TOF cameras that may be utilized in particular implementations of 3D gesture recognition systems that may be constructed in accordance with one or more embodiments of the invention may include systems manufactured by Canesta, Centre Suisse d'Electronique et de Microtechnique SA (CSEM), or 3DV Systems. While these cameras may all differ in their capabilities and properties, they all can be used in conjunction with a depth engine incorporated in the computing system.

Examples of 2D displays that may be utilized in particular implementations of 3D gesture recognition systems constructed in accordance with one or more embodiments of the invention may include an ultra-lightweight organic LED screen, as well as more conventional screens currently being utilized in vehicles. In particular implementations, a 3D display could also be utilized.

The computing platform may include any of a wide variety of components, including one or more processors, memory, one or more cards, controllers, electrically erasable programmable read-only memory (EEPROM), power supplies, fans, and any other electronic component. In particular implementations, an embedded video card system may be utilized.

During operation of the system, images collected by TOF camera 110 are sent to computing platform 120 for processing. During the processing step computing platform 120 may utilize the one or more databases 130 to determine on or more gestures the series of images may represent. Computing platform 120 is adapted to correlate any recognized gestures with one or more predefined commands and then to implement the commands by changing an aspect of the user interface image displayed by the 2D screen (causing the user interface image to scroll, a new image to appear, or indicating the pressing of an object within the image), and many other user interface activities, or other commands or activities associated with the operation or other aspects of the vehicle in question.

A static gesture is a particular orientation of the hand or arm or other gesture indicator that may be employed by a user, such as a pointer or the like. Static gestures include orientations of the hand or arm that are recognized when the hand or arm forms a pattern that does not include a movement (such as many American Sign Language signs). Dynamic gestures include orientations of the hand or arm that are recognized when the hand, fingers, palm, wrist, or arm move in a particular orientation, perform a defined action, or make a defined movement. Implementations of 3D gesture recognition systems presented in accordance with one or more embodiments of the present invention are preferably configured to recognize both static and dynamic gestures, but may be configured to recognize only one or the other, or alternatively may be configurable as desired to recognize one, the other, or both types of gestures. Without using a combination of both static and dynamic gestures, however, implementations of 3D gesture recognition systems may lack the ability to operate effectively, and while they may in fact be compromised in one or more ways, they may also be applicable on one or more particular situations.

Figure 2:
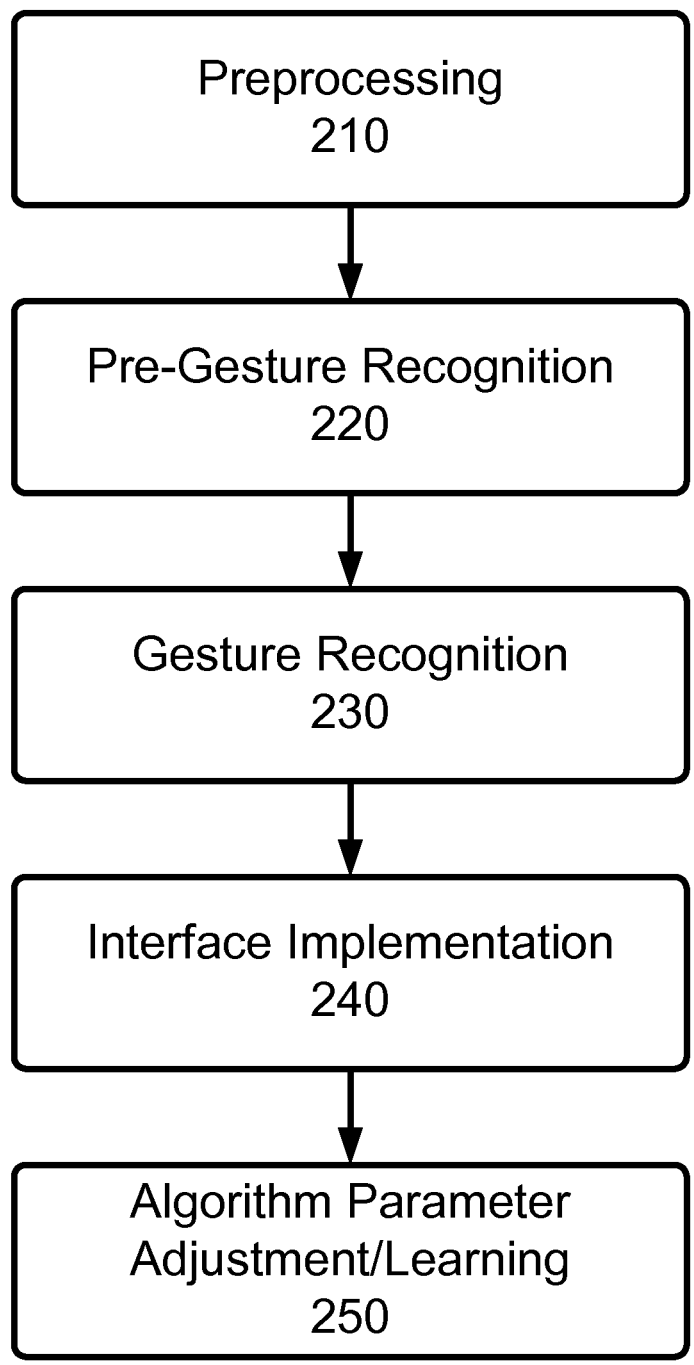
FIG. 2 is a flowchart diagram depicting an overall processing flow in accordance with an embodiment of the present invention.

Generally, and referring to FIG. 2, implementations of methods of 3D gesture recognition presented in accordance with an embodiment of the invention preferably comprise five basic steps: Preprocessing 210, Pre-gesture recognition (depth map, face detection, etc. . . . ) 220, Gesture recognition 230, Interface implementation 240, and Algorithm parameter adjustment/learning 250. Each of these steps may contain a number of other processing steps, and each will be considered in turn. Each of, or any combination of these steps may be implemented in or as part of an implementation of a depth engine included within the computing system.

Figure 3:
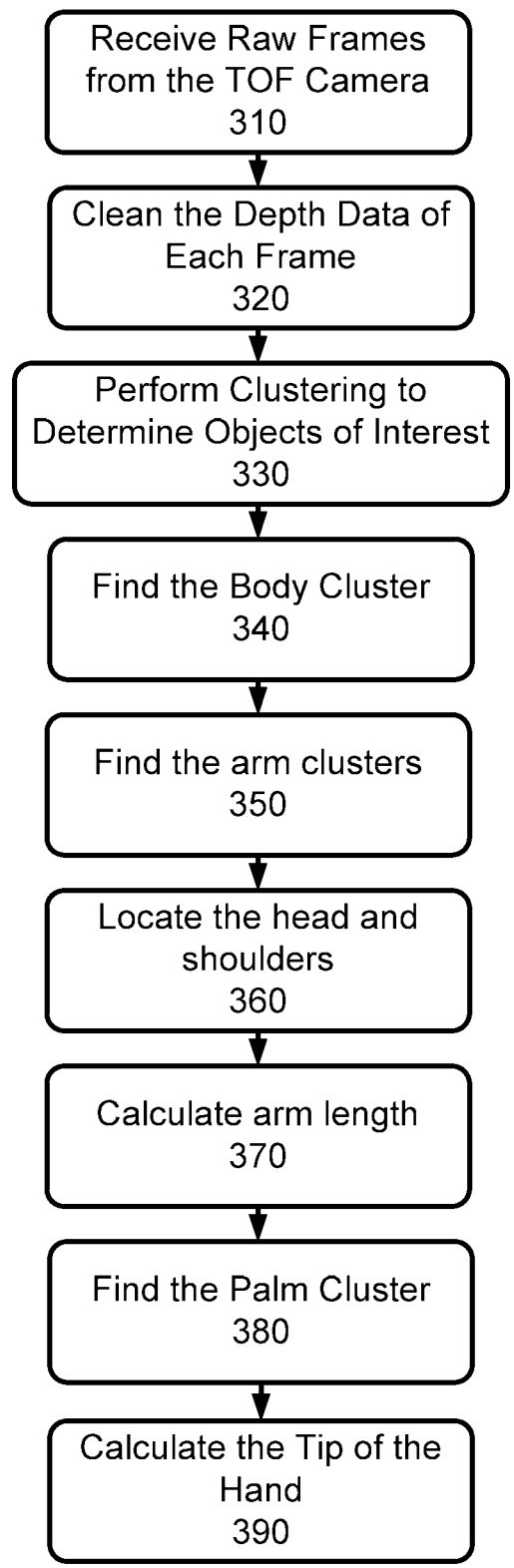
FIG. 3 is a flowchart diagram depicting processing to identify one or more user gesture indication portions of the body in accordance with an embodiment of the present invention.

During preprocessing step 210, and referring to FIG. 3 which depicts the preprocessing step in greater detail, implementations of 3D gesture recognition methods in accordance with an embodiment of the present invention include may include various steps at the preprocessing stage. As illustrated, the computing system may receive raw depth data included in raw, or unprocessed, frame data from the TOF camera at step 310. TOF cameras generally provide a pixel by pixel depth map of any objects in the field of view in contrast with video or other cameras that provide a pixel by pixel light reflectance map of the objects in the field of view. The raw frames from the TOF camera may include influences from a wide variety of factors, including, by non-limiting example, lens aberration, user skin tone variation, lighting conditions, distance of the camera, foreshortening, camera alignment, signal aliasing, or any other factor influencing a TOF camera image.

As is further illustrated in FIG. 3, implementations of 3D gesture recognition systems may remove, compensate, adjust, or correct for any of the foregoing factors by utilizing implementations of methods of cleaning the depth data of each frame at step 320. A wide variety of conventional, calculated or predetermined, filtering techniques may be utilized in particular implementations of the method of one or more embodiments of the invention. When the data has been cleaned, the images may be normalized, enhanced, or otherwise improved to allow the system to observe the gestures made with greater accuracy and robustness.

At step 330 of FIG. 3, the cleaned depth data from the TOF camera may then be subjected to 3D (frame-by-frame) and 4D (frame-to-frame with time being the fourth dimension) clustering to determine any objects of interest contained in the data. At this stage, the objects of interest may include the body of the user, other major appendages, or any other object (such as a portion of the vehicle) within the field of view that may or may not be used in future processing. A wide variety of statistical, algorithmic, parametric, or other methods may be utilized to perform the clustering of the cleaned depth data in particular implementations of 3D gesture recognition methods. One or more particular methods of performing the clustering may be implemented using a wide variety of computer languages and data processing techniques within the computing system, including, by non-limiting example, MATLAB®, C++, C#, Visual Basic, Compute Unified Device Architecture (CUDA), or any other programming language or combination of computing or programming techniques.

Once the cluster(s) corresponding with one or more objects of interest have been identified, in particular implementations of 3D gesture recognition system algorithms in accordance with embodiments of the invention, portions of the depth data not corresponding with the objects of interest may be disregarded and not processed in subsequent steps. In other implementations, some or all of this data may continue to be included. In either implementation, various implementations of clustering techniques are utilized to identify from the cluster data containing the objects of interest which cluster corresponds with the body of the user (the body cluster) at step 340.

Once the body cluster has been identified, implementations of the method of one or more embodiments of the invention may then use various implementations of clustering techniques to find from the clusters corresponding with the objects of interest the cluster(s) corresponding with the arm(s) of the user at step 350. In particular implementations, the clustering technique implementations may utilize searching algorithms that look for the arm clusters in specific regions relative to the body cluster. After the arm clusters have been identified, the specific clustering technique implementations utilized in 3D gesture recognition method implementations may then locate the head and shoulders at step 360. In particular implementations, the head and shoulders may be located as segments from the clusters corresponding to the objects of interest; in other embodiments, the location of the clusters may be calculated and then identified from the objects of interest; and in still other embodiments, the head and shoulders may be located by searching in specific regions defined relative to the body cluster. Since during use conditions, the user's head and/or shoulders may be angled relative to the TOF camera, a wide variety of correction techniques may be used to resolve the angle and eliminate it from the images, or otherwise compensate therefore to improve system performance and/or accuracy. An alternate approach would be to train a deep belief network on various orientations, such that the output (label neurons) identify gestures with a predefined set of degrees of freedom.

Once the head and/or shoulders have been identified, implementations of 3D gesture recognition systems in accordance with embodiment of the invention at step 370 may calculate the arm length of the user using previously learned and/or stored information that relate the arm length of an individual to his or her height, shoulder proportion, head size, or any other relevant measurement of a human male or female. Once the calculation has been performed, implementations of 3D gesture recognition systems in accordance with one or more embodiments of the present invention may perform a search using implementations of clustering techniques in an area of the "cleaned" frame data that corresponds with the calculated arm length, may perform a search within a range of distances within the cleaned frame data relative to the head or other located portion of the body, or use any other method of searching for cluster data corresponding with the palm of the hand at step 380. Because arm length proportions vary from person to person, and particularly for children and teenagers, a set of pre-defined or learned parameters may be used that may be adaptively changed based on actual data received regarding the user. An alternative would be to trace the depth values back to real-world coordinates, and then use data biometrics for looking up or calculating such parameters. The adaption may take place as the parameters are adjusted in real-time based on failures or other errors during image processing, or the adaption may take place in a feed-back fashion after each or a certain number or type of gestures have been recognized and/or processed.

Referring to FIG. 3, once the palm of the hand has been identified, implementations of 3D gesture recognition systems in accordance with one or more embodiments of the invention may calculate the tip of the hand at step 390. In particular implementations the tip of the hand may be defined as the location of the tip of the middle finger, or other predetermined and/or desirable portion thereof. With the position of the palm and the tip of the middle finger identified, the system is now ready for pre-gesture recognition steps.

Figure 4:
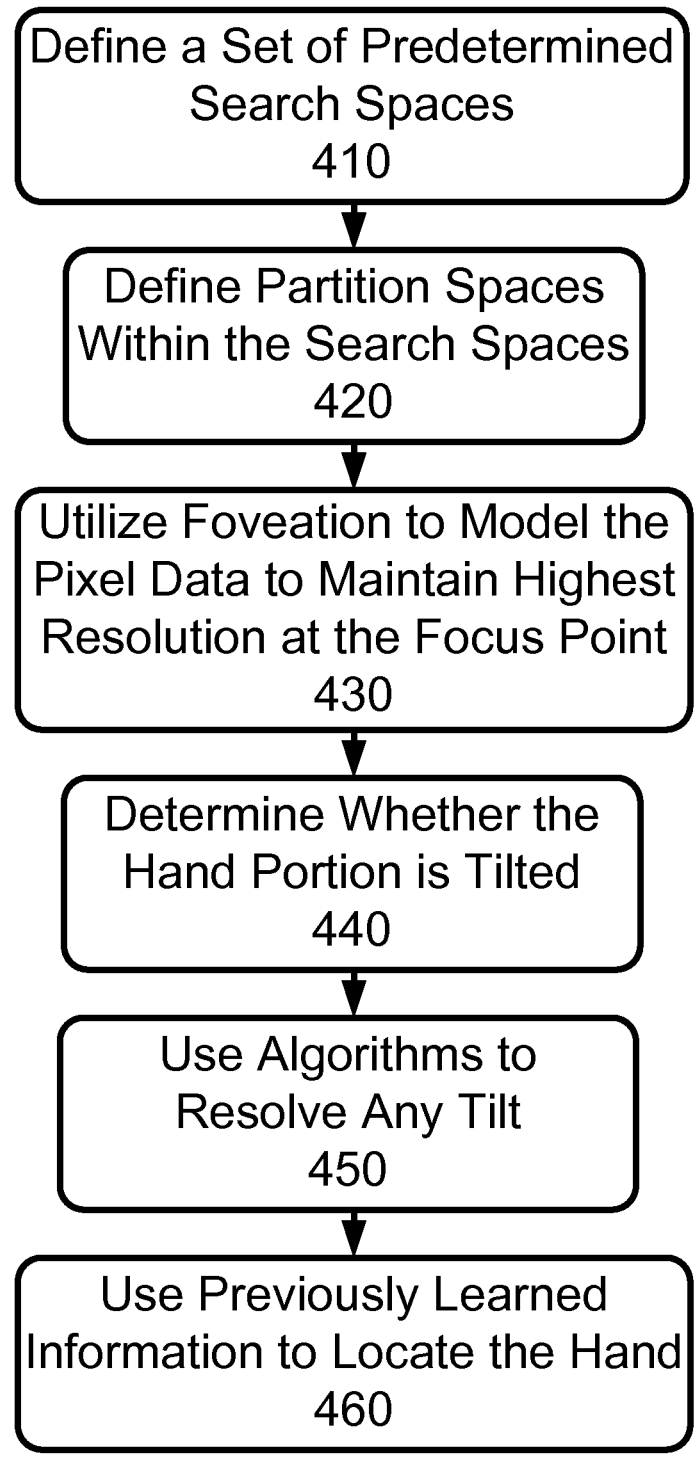
FIG. 4 is a flowchart diagram depicting processing to locate a hand or other body part in accordance with an embodiment of the present invention.

Referring next to FIG. 4, during pre-gesture recognition, implementations of 3D gesture recognition methods presented in accordance with one or more embodiments of the present invention may define a set of predetermined search spaces within each frame of cleaned depth data in which to look for the tip of the middle finger and palm or look for movement of the tip of the middle finger and palm at step 410. Within each of these search spaces, one or more partition spaces may be defined at step 420 that divide the search spaces into smaller areas. Then, at step 430, when the tip of the finger/palm/hand or any other portion of the hand enters one of the partition spaces, foveation may be used in particular implementations to model the pixels containing the cleaned depth data to maintain highest resolution at the tip of the finger or other desired focus point on the hand and assign lower resolution to some or all of the other clusters in each frame image (like the body cluster). By utilizing foveation, the computing power of the computing system may be utilized most effectively as the computing system may need to process only portions of each frame image at its highest resolutions. This may also improve accuracy, robustness, and learning in particular implementations.

Once the tip of the finger/other portion of the hand has been identified, then implementation of 3D gesture recognition systems presented in accordance with one or more embodiments of the present invention may determine whether the hand portion is tilted vertically relative to the camera, toward the camera, or away from the camera at step 440. Once the tilt has been identified, the system may utilize various algorithms at step 450 to resolve the tilt, such as, by non-limiting example, principal component analysis, or any other method of determining the orientation of an object in a set of depth data. If the tilt is not removed from the data, the number of gesture recognition algorithms may be needlessly increased to ensure that each tilted gesture is recognized the same as any non-tilted gesture. The level of accuracy, robustness, and repeatability of the system may also be adversely affected in particular implementations.

Referring once again to FIG. 4, once the tilt of the hand has been resolved, at step 460 previously learned information may be used to locate the hand with a certain level of certainty. The level of certainty may be determined using statistical or experimental methods and the learned information may be stored in the databases accessible to the computing system.

Figure 5:
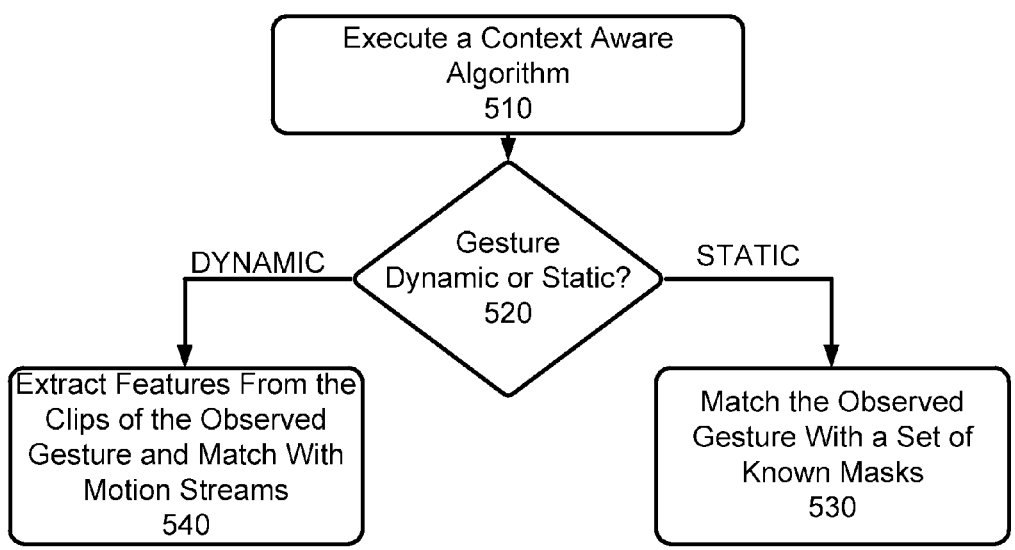
FIG. 5 is a flowchart diagram depicting processing for recognizing a static or dynamic gesture in accordance with an embodiment of the present invention.

Once the hand has been located with a certain level of certainty, implementations of 3D recognition systems presented in accordance with one or more embodiments of the present invention may now be ready to perform various gesture recognition steps. Referring next to FIG. 5, implementations of 3D recognition systems presented in accordance with one or more embodiments of the invention may execute a context-aware algorithm at step 510. Implementations of context-aware algorithms may include algorithms that retrieve from a table of known gestures those that are active (or allowed for execution) in the particular context of the gesture just observed. For example, when the image on the 2D screen is centered over an object on the map, the only two gestures that may be active may be a gesture that allows for selection of the object or a gesture that moves the image away from being centered over the object. All other gestures may be ignored, even though implementations of 3D recognition systems may attempt to recognize some or all gestures the user is performing while driving or otherwise operating the vehicle in question.

Once a gesture has been observed and the specific active gesture algorithms retrieved by the computing system, implementations of 3D gesture recognition systems may determine whether the gesture observed is a static or dynamic gesture at step 520. This determination may be made by performing a first comparison of the gesture with any of the active static and/or dynamic gestures. In other implementations, the determination may be made by analyzing each frame or group of frames for certain elements that identify a static or dynamic gesture (such as speed or direction of hand movement, or position of a particular portion of the hand). If at step 520 it is determined that the gesture was a static gesture, processing continues at step 530 and the observed gesture may be matched with a set of known masks included in the one or more databases using an algorithm for each known static gesture (images may be represented by numbers in a table, or full images of all 1000 possible hand positions stored in a lookup table, for example) using a cross correlation technique or other image correlation technique to make the comparison. If the gesture was identified at step 520 as a dynamic gesture, processing passes instead to step 540, and features from clips of the observed gesture may be extracted and matched with motion streams stored in the one or more databases. A deep belief network is used for gesture recognition. Input data representing the hand are used with the associated DBN. A neural network or other video or image correlation technique may be employed to make the correlation. Particular implementations of gesture recognition systems may utilize 10-15 frame segments of the observed gestures during the feature extraction and correlation steps.

Once the observed gesture has been recognized, implementations of 3D gesture recognition systems presented in accordance with one or more embodiments of the present invention are now ready to implement one or more commands corresponding with the recognized gesture using the computing system and/or the 2D display. Referring to FIG. 6, the implementation may first implement step 610 for retrieving a command corresponding with the matched gesture that is to be implemented on the 2D display using the current context of the gesture and/or the nature of the gesture itself, and at step 620 executing the command using the computing system and/or the 2D display. An indication that the command has been or is being executed may be visible on the 2D display or may be indicated by audible or other feedback to the user (push the button, call on the telephone, scroll the map, raise the bubble, etc). In addition to presenting a response on the 2D display, other responses may be possible in response to the issues command, including one or more vehicle actions.

During or after each or any number of gesture recognition process completions or after or during any step within the gesture recognition process, implementations of 3D gesture recognition system presented in accordance with one or more embodiments of the present invention may employ a wide variety of machine learning algorithms and/or process implementations that permit the system and/or method to be adjusted to more accurately recognize gestures made by a particular user or users. Referring finally to FIG. 7, a high level diagram of the basic steps included in this wide variety of machine learning algorithms and/or process implementations is illustrated. As is shown, embodiments of the present invention may include at step 710 reviewing a previously executed gesture recognition process or completed processes or the just executed step or steps and determining any of a wide variety of sub-optimal conditions such as, by non-limiting example, errors, retries, time-outs, warning conditions, data corruption problems, or any other less desirable characteristic of the process and/or step. At step 720, new values for algorithm/system parameters may be determined using information obtained during the review. These new parameters may be stored at step 730 in the one or more databases or the computing system itself. Because machine learning algorithms and or/process implementations are utilized in implementations of 3D recognition systems and methods, the resulting systems and methods may be capable of evolving to accurately capture specific user gestures and may avoid the need for external algorithm modification, thus allowing the system and methods to be adaptively used and implemented.

One or more of the 3D gesture recognition systems presented in accordance with one or more of the embodiments of the present invention may have one or more of the following advantages over the current state-of-the-art. The use of clustering algorithms, along with foveation, permit more robust and faster recognition of gestures. The ability of implementations of the system to adapt its own recognition algorithms permits it to become more robust over time without requiring external intervention and eliminating errors. The ability of the system to use the body of the user as a reference eliminates the requirement that the user maintain an exact position or be still for a predetermined period of time before gesture recognition can take place. Many other advantages exist and will be evident to those of ordinary skill in the art using the principles disclosed in accordance with the embodiments of this invention.

The materials used for the computing systems, TOF cameras, 2D displays, and databases may be made of conventional materials used to make goods similar to these in the art, such as, by non-limiting example, plastics, metals, semiconductor materials, rubbers, composites, and ceramics. Those of ordinary skill in the art will readily be able to select appropriate materials and manufacture these products from the disclosures provided herein.

The implementations listed here, and many others, will become readily apparent from this disclosure. From this, those of ordinary skill in the art will readily understand the versatility with which this disclosure may be applied.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

What is claimed:

1. A method for performing gesture recognition in a vehicle, comprising the steps of:
  receiving one or more raw frames from a time of flight (TOF) camera of a vehicle occupant;
  performing clustering to determine one or more objects of interest of the vehicle occupant;
  locating one or more arm clusters of the vehicle occupant;
  locating a palm cluster of the vehicle occupant;
  calculating a location of a tip of a hand of the vehicle occupant;
  defining one or more predetermined search spaces in accordance with the location of the tip of the hand;
  defining one or more partition spaces within the one or more search spaces; and
  locating the hand within the partition and search spaces.

2. The method of claim 1, further comprising the step of cleaning a depth data of each of the one or more raw frames.

3. The method of claim 1, further comprising the steps of:
  observing whether the hand has performed a dynamic or a static gesture;
  if the hand has performed a dynamic gesture, matching the observed gesture with a set of known masks to determine an intended static gesture; and
  if the hand has performed a dynamic gesture, extracting features from one or more clips of the observed gesture and match with one or more predefined motion streams to determine an intended dynamic gesture.

4. The method of claim 3, further comprising the steps of:
retrieving a command corresponding to one of the determined static and dynamic gesture; and
executing the command.

5. The method of claim 4, wherein the command is executed in accordance with a computing system and display within the vehicle.

6. The method of claim 3, wherein the known masks are determined for a particular individual vehicle occupant.

7. The method of claim 3, wherein the predefined motion streams are determined for a particular individual vehicle occupant.

8. The method of claim 1, further comprising the step of selecting the vehicle occupant from among a plurality of individuals in the vehicle.

9. The method of claim 1, wherein a processor is adapted to determine the vehicle occupant from among two or more individuals in the vehicle.

10. A method for performing gesture recognition of a vehicle occupant employing a time of flight (TOF) sensor and a computing system in a vehicle, comprising the steps of:
receiving one or more raw frames from the TOF sensor;
performing clustering to locate one or more body part clusters of the vehicle occupant;
calculating a location of a tip of a hand of the vehicle occupant;
defining one or more predetermined search spaces in accordance with the location of the tip of the hand;
defining one or more partition spaces within the one or more search spaces; and
locating the hand within the partition and search spaces;
determining whether the hand has performed a dynamic or a static gesture;
retrieving a command corresponding to one of the determined static and dynamic gesture; and
executing the command.

11. A system for performing gesture recognition in a vehicle, comprising:
a time of flight (TOF) camera for providing one or more raw frames of a vehicle occupant; and
a processor for performing clustering to determine one or more objects of interest of the vehicle occupant, locating one or more arm clusters of the vehicle occupant as one of the objects of interest, calculating a location of a tip of a hand of the vehicle occupant, defining one or more predetermined search spaces in accordance with the location of the tip of the hand, defining one or more partition spaces within the one or more search spaces, and locating the hand within the partition and search spaces.

12. The system of claim 11, wherein the processor is further adapted to clean a depth data of each of the one or more raw frames.

13. The system of claim 11, wherein the processor is further adapted to observe whether the hand has performed a dynamic or a static gesture, if the hand has performed a dynamic gesture, match the observed gesture with a set of known masks to determine an intended static gesture, and if the hand has performed a dynamic gesture, extract features from one or more clips of the observed gesture and match with one or more predefined motion streams to determine an intended dynamic gesture.

14. The system of claim 13, wherein the processor is further adapted to retrieve a command corresponding to one of the determined static and dynamic gesture, and execute the command to perform one or more vehicle actions.

15. The system of claim 14, further comprising a computing system for implementing the command.

16. The system of claim 14, wherein the computing system further comprises a display for displaying a response to the command to the vehicle occupant.

17. The system of claim 13, wherein the processor is adapted to determine the known masks for a particular individual vehicle occupant.

18. The system of claim 13, wherein the processor is adapted to determine the predefined motion streams for a particular individual vehicle occupant.

* * * * *